(12) United States Patent
Garrett

(10) Patent No.: US 6,308,792 B1
(45) Date of Patent: Oct. 30, 2001

(54) ELECTRICAL SWITCH FOR A WAGON

(76) Inventor: Michael S. Garrett, 11507 Brookshire Dr., Orland Park, IL (US) 60467

( * ) Notice: Subject to any disclaimer, the term of this patent is extended or adjusted under 35 U.S.C. 154(b) by 0 days.

(21) Appl. No.: 09/309,435

(22) Filed: May 11, 1999

(51) Int. Cl.[7] .................................................. B62D 51/04
(52) U.S. Cl. ......................................... 180/19.3; 200/505
(58) Field of Search .................................. 180/19.1, 19.2, 180/19.3; 200/505, 16 C, 16 D, 17 R, 52 R, 61.57, 61.85, 276

(56) References Cited

U.S. PATENT DOCUMENTS

| | | |
|---|---|---|
| 1,911,444 * | 5/1933 | Fator . |
| 3,463,990 * | 8/1969 | Ross . |
| 3,907,056 * | 9/1975 | Thomas III .......................... 180/19.1 |
| 4,331,849 | 5/1982 | Wolf . |
| 4,540,871 * | 9/1985 | Corrigall et al. ................ 219/137.63 |
| 4,738,084 | 4/1988 | Ogano et al. . |
| 4,973,206 * | 11/1990 | Engle ...................................... 410/67 |
| 5,245,144 | 9/1993 | Stammen . |
| 5,451,735 * | 9/1995 | Worthington et al. ................ 200/505 |
| 5,595,259 | 1/1997 | Gilliland et al. . |
| 5,657,669 | 8/1997 | Barnard . |
| 5,680,748 | 10/1997 | Barnard . |
| 5,736,702 * | 4/1998 | Roberts et al. ..................... 200/81 H |

\* cited by examiner

Primary Examiner—Kevin Hurley
(74) Attorney, Agent, or Firm—Wallenstein & Wagner, Ltd.

(57) ABSTRACT

A switch is connected to a wagon for electrically powering the wagon. The wagon has a frame having at least one wheel for movement along a surface. The wagon further has a bar connected to the frame, the bar having a handle. The wagon further has a battery connected to a motor mounted on the wheel for powering the wheel. The switch has a wire shell having a first lead extending therefrom and adapted to be connected to the motor. A pipe member has an insulator ring mounted on the pipe member. The pipe member has a second lead extending therefrom and adapted to be connected to the battery. The wire shell is positioned over the pipe member and ring wherein the ring maintains a space between the wire shell and the pipe member to define an inactivated position. The wire shell is resiliently deflectable to a second position contacting the pipe member to define an activated position wherein an electrical connection is made powering the wheel of the wagon for movement along the surface.

20 Claims, 4 Drawing Sheets

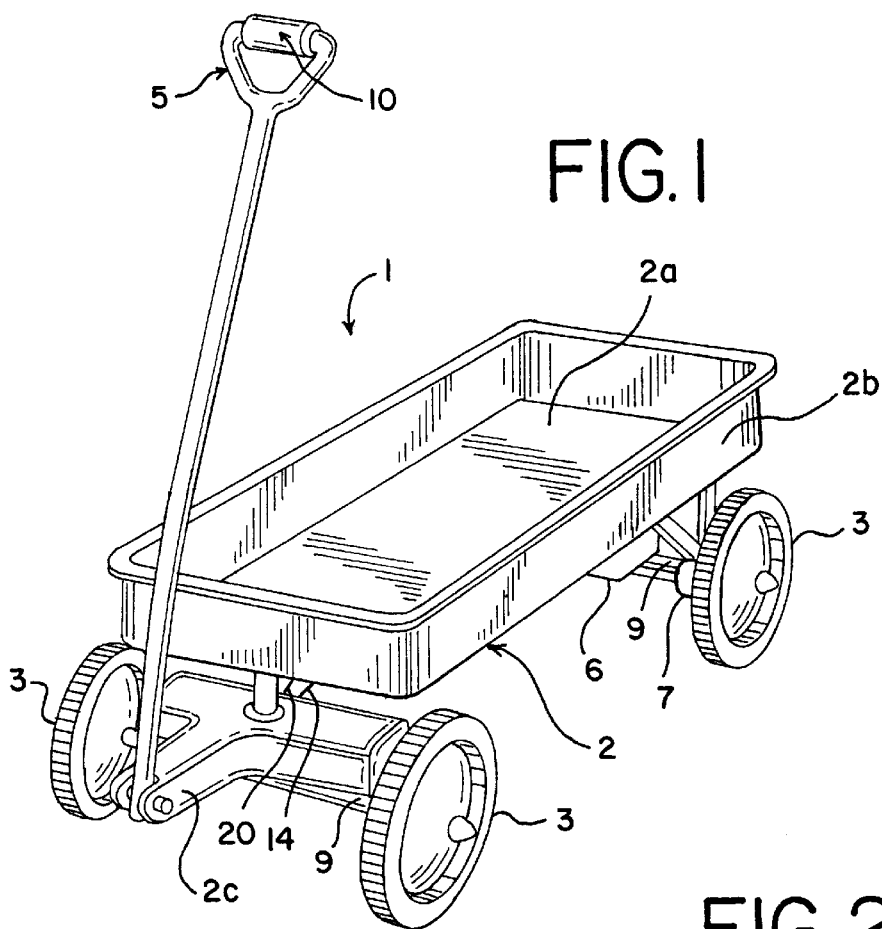
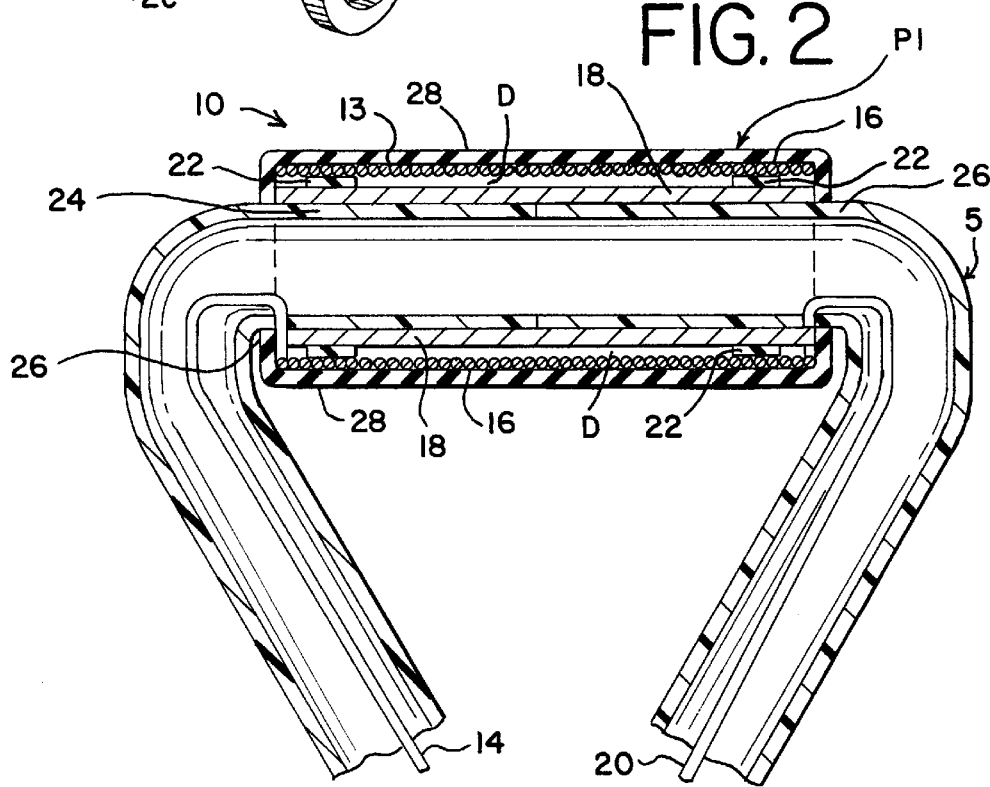

ELECTRICAL SWITCH FOR A WAGON

DESCRIPTION

1. Technical Field

The present invention relates generally to switches, and more particularly to a switch for electrically powering a cart such as a wagon.

2. Background of the Invention

For many years, people, especially children, have enjoyed playing with wagons. A wagon can generally be considered one type of cart having a central frames with wheels attached to the frame. An elongated bar having a handle is attached to the frame to allow a person to pull the wagon. The bar and handle are typically made from metal, wood or plastic. A child can put toys in the wagon or even pull playmates seated in the wagon. Sometimes, a parent may pull a child in a wagon such as when taking a leisurely walk. While this is less strenuous than having to actually carry a child, the parent is still required to pull the entire weight of the wagon, including the child. This can become more difficult when pulling a number of children seated in the wagon. The strength required for pulling the wagon under these circumstances may present considerable difficulties for people having back problem or persons who cannot engage is stressful physical activity due to other reasons.

Besides for its amusement value to children or its transportation value to parents, however, wagons can also be used in many other arduous tasks, such as gardening or toting heavy items around the house or yard. Because of the heavy weights involved, a person having back problems or other medical conditions may find it difficult to pull a wagon carrying a heavy load.

The present invention is provided to solve these and other problems.

SUMMARY OF THE INVENTION

It is an object of the present invention to provide a switch for a powered wagon. A wagon generally comprises a frame having at least one wheel connected to the frame and adapted to roll along a surface. A bar is connected to the frame and has a handle for pulling on the bar and, thus, pulling the wagon. The wagon also has a motor connected to the wheel and connected to a battery.

According to a first aspect of the invention, the wagon has a switch connected to the handle, wherein the switch is activated to power the wheel by applying pressure to the switch. According to a further aspect of the invention, pressure can be applied to the switch by squeezing the handle or pulling the handle.

According to another aspect of the invention, the switch has a wire shell having a first lead extending therefrom and adapted to be connected to the motor. A pipe member has an insulator member mounted on the pipe member. The pipe member has a second lead extending therefrom and adapted to be connected to the battery. The wire shell is positioned over the pipe member and insulator member wherein the insulator member maintains a space between the wire shell and the pipe member to define an inactivated position. The wire shell is resiliently deflectable to a second position contacting the pipe member to define an activated position wherein an electrical connection is made powering the wheel of the wagon for movement along the surface.

According to another aspect of the invention, the switch can be provided in other applications in addition to a cart such as a wagon.

Other features and advantages of the invention will be apparent from the following description taken in conjunction with the following drawings.

BRIEF DESCRIPTION OF THE DRAWINGS

FIG. 1 is a perspective view of a cart in the form of a wagon that is powered and has a switch according to the present invention;

FIG. 2 is a partial cross-sectional view of a handle of the wagon having the switch of the present invention;

DETAILED DESCRIPTION

Figure 3:
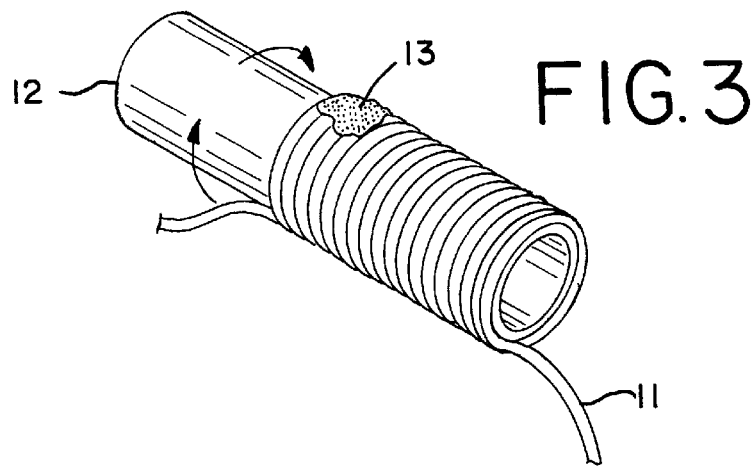
FIG. 3 discloses a first step in making the switch wherein a wire is wrapped around a plug to form a wire shell.

While this invention is susceptible of embodiments in many different forms, there is shown in the drawings and will herein be described in detail, preferred embodiments of the invention with the understanding that the present disclosure is to be considered as an exemplification of the principles of the invention and it is not intended to limit the broad aspects of the invention to the embodiments illustrated.

Referring to the drawings, FIG. 1 discloses a cart in the form of a wagon generally referred to with the reference numeral 1. The wagon 1 is generally comprised of a frame 2, wheels 3, and an elongate bar 4 having a handle 5 for pulling the wagon 1. The frame 2 has a flat surface 2a and sidewalls 2b. Generally, four wheels 3 are used with the wagon 1 although more or less can be used. The wheels 3 allow the wagon 1 to be rolled along a surface such as a sidewalk or driveway. The elongate bar 4, or extension member, has one end attached to the frame 2 and the handle 5 at the other end. In a preferred embodiment of the wagon 1, the frame 2 includes a front member 2c that attaches to the elongate bar 4. The wagon 1 also has axles 9 that connect a pair of wheels 3, one pair of wheels 3 at the front of the wagon 1 and one pair of wheels 3 at the rear of the wagon 1. The wagon 1 further has associated supporting structure to attach the axles 9 and wheels 3 to the frame 2.

A conventional wagon does not have means for powering the wheels to assist in pulling the wagon. The wagon 1 of the present invention, however, includes a drive system that cooperates with the wheel(s) of the wagon to electrically power the wagon for movement along the surface. The wagon has a power supply such as a battery 6. As shown in FIG. 1, the battery 6 is mounted on an underside wagon 1 but could be mounted on other areas of the wagon if desired. The wheels 3 have a gear drive assembly 7. In a preferred embodiment, only the rear wheels are equipped with a gear drive assembly 7 although more or less wheels could be so equipped. The gear drive assemblies 7 are equipped with motors and are connected to the battery 6 to drive the wheels 3 when activated as will be described in greater detail below. In a preferred embodiment, the gear drive assemblies 7 utilized can be purchased from American Science and Surplus of Orland Park, Ill. under Part No. 27172.

As shown in FIG. 2, the wagon 1 of the present invention includes a switch 10 that can be activated to power the wagon 1 along the ground thus assisting a person pulling the wagon 1. A method of manufacturing the switch 10 will first be described and then the structure and operation of the switch 10, as it is connected to the wagon 1, will be described.

As shown in FIG. 3, a wire 11 is first coiled around a plug 12 made of any suitable material. In one preferred embodiment, the wire 11 is a braided copper wire, fourteen gauge (1/16 inch diameter). Other embodiments, however, are possible. For example, a solid, unbraided wire could be utilized although such wire, while flexible when pulling on a coil made therefrom, it is not as easy to squeeze a coil made from solid wire. A foil structure could also be used. It is further understood that any gauge wire could be utilized. At one end of the coiled wire 11, a first lead wire 14 is provided that will be attached to the battery 6 as will be described below. The first lead wire 14 could be merely an extension from the wire 11 or another wire suitably connected to the wire 11. The lead wire 14 is of sufficient length to connect to the battery 6. As further shown in FIG. 3, to allow the coiled wire 11 to retain its shape and remain sturdy and versatile, an adhesive 13 is applied to the coiled wire 11. Preferably, silicon glue 13 is used and is applied to a full periphery of the coiled wire 11 wrapped around the plug 12. The glue 13 is allowed to dry, and then the plug 12 is removed from within the coiled wire 11 thus forming a first conductor member 16, or a wire shell 16. The wire shell 16 has resilient properties wherein a force can be applied to the shell 16 to place it in a deflected state, and wherein the shell 16 will return to its original state after the force is removed. Preferably, all sides of the wire shell 16 can flex.

Figure 4:
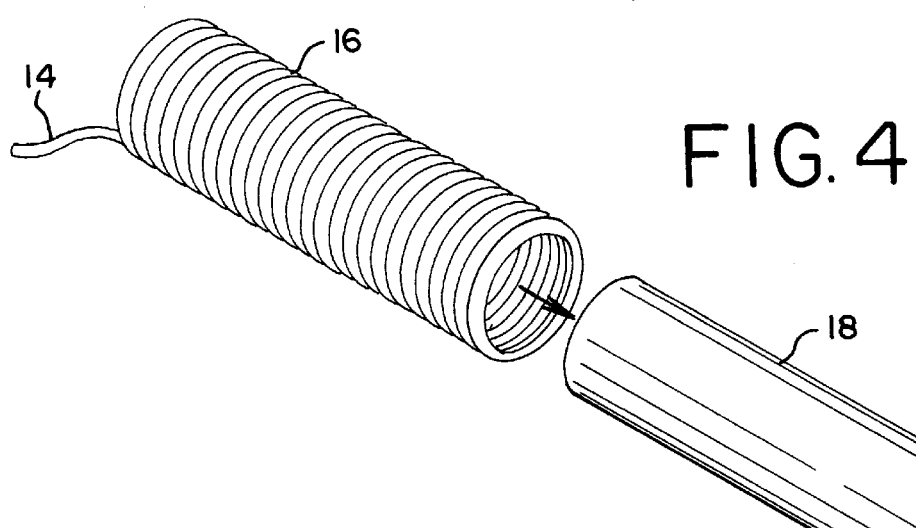
FIG. 4 discloses the wire shell and a conductor member.
Figure 5:
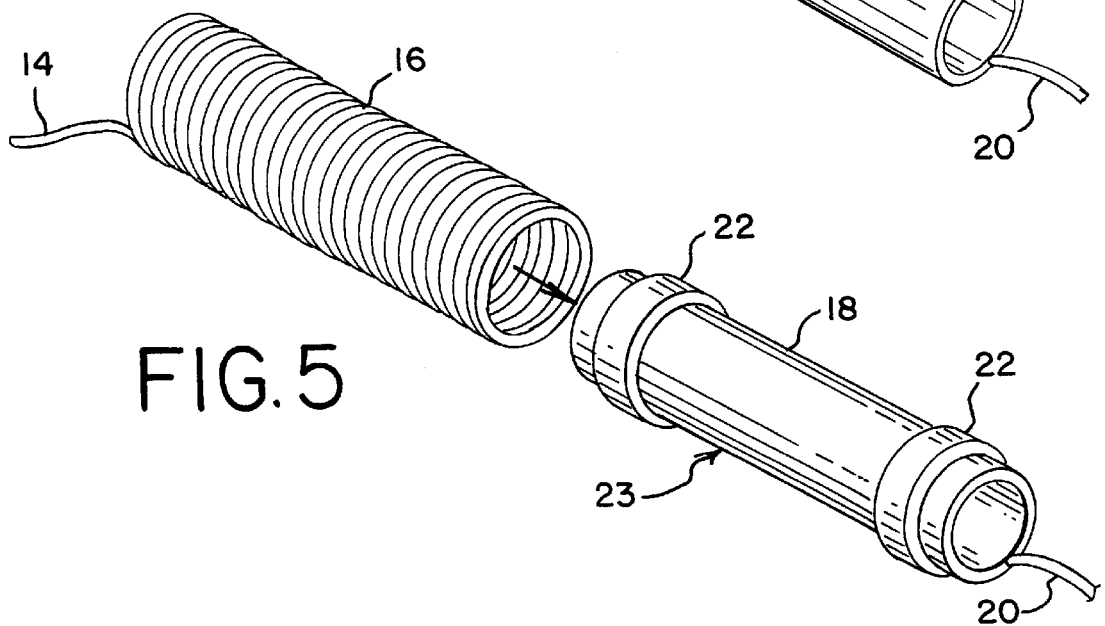
FIG. 5 discloses the conductor member having a pair of spacer members mounted thereon.

As shown in FIG. 4, a second member 18 is provided. The second member 18 is typically a conductive pipe member 18. The second conductor member 18 is preferably made from copper although other materials are possible. In addition, the conductor pipe member 18 is preferably cylindrical although other shapes are possible. In one preferred embodiment, the pipe 18 has a 7/8 inch diameter. A second lead wire 20 is connected to one end of the pipe member 18 such as by soldering although other connecting methods are possible as are known in the art. The second lead wire 20 is adapted to be attached to a motor of the gear assemblies 7 as will be described in greater detail below. As shown in FIG. 5, the pipe member 18 has a pair of spacer members 22 mounted thereon, one near each end of the pipe 18. In a preferred embodiment, the spacer members 22 are rings 22. The rings 22 are mounted near the end of the pipe such that the wire shell 16 will not be able to deflect to contact the pipe 18 at the outboard end of the pipe 18. If desired, the rings 22 can be mounted flush with the end of the pipe 18 (See e.g., FIGS. 8 and 9). The rings 22 are made from an insulating material such as plastic. Other insulating materials could also be used such as insulating tape. For example, insulating tape could be wrapped around the pipe member 18 to form the insulator members 22. While two spacer rings 22 are preferably used, more or less rings 22 can also be utilized. The pipe member 18 and rings 22 together form an inner assembly 23.

As further shown in FIG. 5, the wire shell 16 is positioned over the pipe 18 by sliding the wire shell 16 over the pipe 18 and insulator rings 22. Thus, the initial plug 12 is selected with a particular diameter and the insulator rings 22 are selected with a particular thickness t such that the wire shell 16 can be slid over the rings 22 and pipe 18. As shown in the cross-sectional view of FIG. 2, the insulator rings 22 maintain a distance D between the wire shell 16 and the pipe 18; i.e. a space of the length D is maintained between the first member 16 and the second member 18 when the switch is in an inactivated position PI. Thus, the first conductor member or wire shell 16 and second conductor member or pipe member 18 are positioned circumjacent one another. In a preferred embodiment, the wire shell 16 is positioned circumjacent, or surrounding, the pipe member 18. In a preferred embodiment, the space D is approximately 2 mm or 1/16 inch. It will be understood that the spacers 22 can be selected at different thicknesses t, which will then vary the space D as desired.

Thus, the switch 10 comprises the wire shell 16, having the first lead 14 extending therefrom, positioned over the pipe member 18, and having the second lead 20 extending therefrom. Accordingly, in a preferred embodiment, the pipe member 18 is positioned within the wire shell 16 wherein the wire shell 16 completely surrounds the pipe member 18 and is thus circumjacent the pipe member 18. Once constructed, the switch 10 can be incorporated into an electrical circuit to activate a load. For example, in a preferred embodiment, the switch 10 is installed into the handle 5 of the wagon 1 of the present invention. As shown in FIG. 2, the handle 5 typically has a straight tubular section 24 that is adapted to be grasped by one's hand to pull the wagon 1. It is understood that wagon handles can take other forms and even constitute an end section of the elongate bar 4. The switch 10 is preferably mounted at the straight section 24. FIG. 2 shows a configuration wherein the handle 5 has been previously separated and the switch 10 slid over the straight section 24. In another preferred embodiment, and as described in greater detail below (FIG. 9), a central portion of the straight section 24 would be removed from the handle 5 and the switch 10 would be mounted at ends 26 of the straight section 24. If desired, the switch can have a cover 28 mounted thereon for a more secure and comfortable grip. The cover 28 could, for example, be made from a foam rubber.

Also, as shown in FIG. 2, the handle 5 and elongate bar 4 of the wagon 1 are typically tubular in shape. Thus, in a preferred embodiment, the first lead wire 14 is routed through one side of the tubular handle 5 and down through the bar 4. The second lead wire 20 is routed through the other side of the tubular handle and down through the bar 4. From there, the leads 14,20 are routed along an underside of the frame 2 and connected to the battery 6 and gear assemblies 7 as described below. This provides an optimum routing path and lessens the chance of the leads becoming entangled during use of the wagon 1. The leads 14,20 are connected to the battery 6 and gear assemblies 7 (connected to the wheels 3) thus providing an electrical circuit 30 (FIG. 7) for electrically powering the wagon 1. It is understood that the leads 14,20 are insulated from one another to avoid a short circuit.

Figure 7:
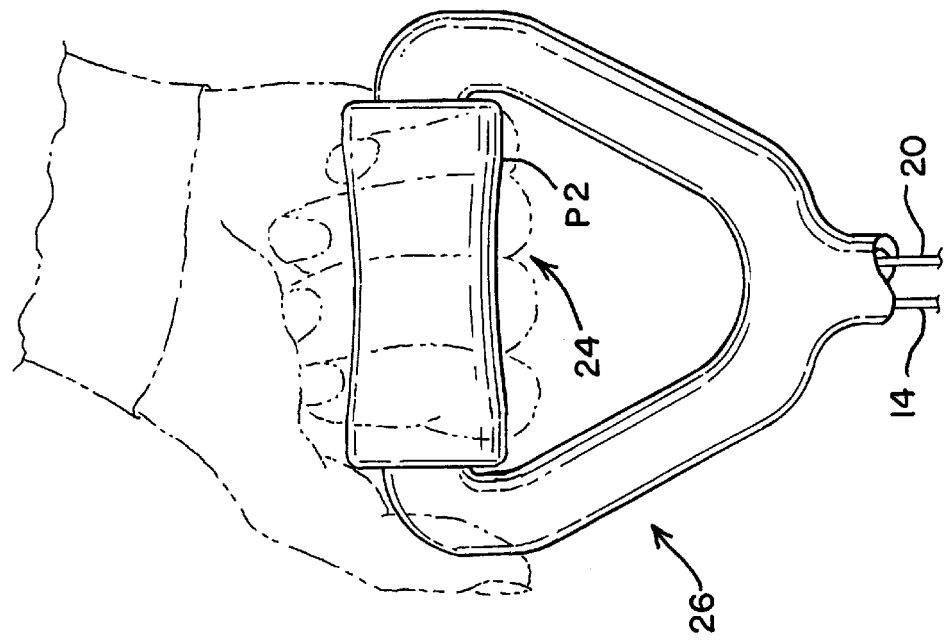
FIG. 7 discloses a schematic diagram of the switch circuitry.

It is understood that the gear assemblies 7 are equipped with a motor M for driving the wheels 3 when the circuit 30 is closed. As shown in FIG. 7, the first lead wire 14 is routed and connected to one side of the gear assemblies 7 having the motor M. The gear assemblies 7 are electrically connected to one terminal of the battery 6. The second lead wire 20 is routed and connected to the other terminal of the battery 6. This completes the structure of the circuit 30. When the switch 10 is in the inactivated position P1 as shown in FIG. 2, the circuit 30 is not closed because of the distance D between the wire coil 16 and the pipe 18. Thus, no power is provided to the wheels 3 of the wagon 1.

Figure 6A:
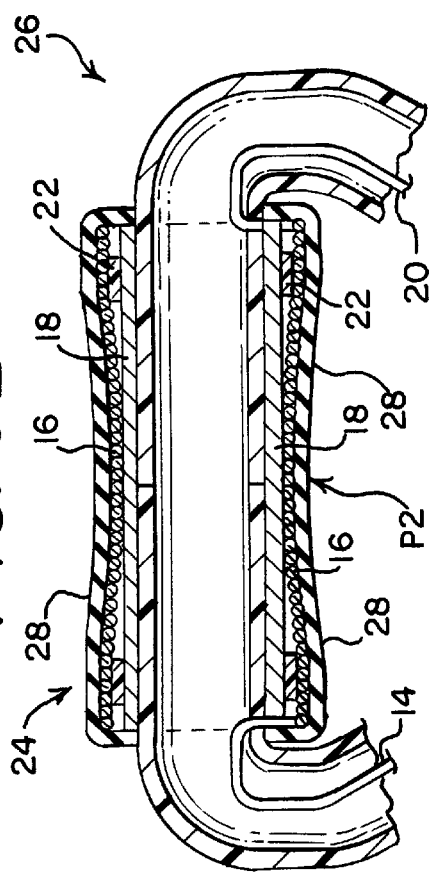
FIG. 6A is partial elevational view of the handle showing a person squeezing the handle.
Figure 6B:
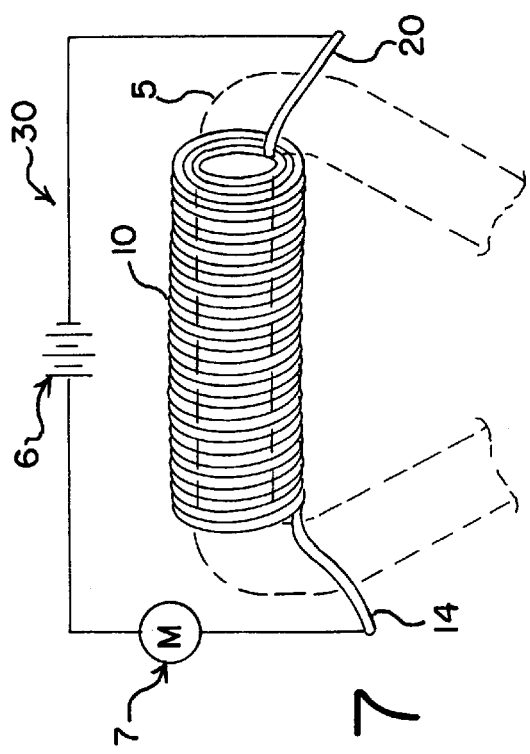
FIG. 6B is a partial cross-sectional view of the handle shown in a squeezed state.

To supply power to the gear assemblies 7 and therefore drive the wheels 3 to power the wagon 1, the circuit 30 must be closed by the switch 10. In general, the circuit 30 is closed by placing the switch 10 in a deflected position, or its activated position P2 as shown in FIG. 6A. To this end, an operator can grasp the switch 10 and apply a force to the switch 10 such as by squeezing the switch 10. As shown in FIG. 6B, the force deflects the wire shell 16 where the distance D between the shell 16 and the pipe 18 is eliminated. When the switch 10 is placed in its activated position P2, the shell 16 is in contact with the pipe 18. This contact closes the circuit 30 because, as can be appreciated from FIGS. 6 and 7, current can flow through the motor M and battery 6 and through the first lead 14, through the wire shell 16, through the pipe member 18 and through the second lead 20. Therefore, power is supplied to the gear assemblies 7 thus driving the wheels 3 of the wagon 1. Thus, an operator turns the motor ON by squeezing the switch 10 (closing the circuit 30) and turns the motor OFF by relieving pressure off of the switch 10 (opening the circuit). Because the wire shell 16 has resilient properties as discussed, it returns to its original state when pressure is relieved from the switch 10 thereby reestablishing the distance D and opening the circuit 30. It is understood that the switch 10 is typically deflected generally at a midportion although it could be deflected towards its ends. Thus, one can squeeze the switch 10 at areas spaced from the center to activate the switch 10.

In addition, besides for squeezing the switch 10, the operator can merely pull the wagon 1 by the handle 5. The resistance provided by the weight of the wagon itself or in conjunction with a sufficient load placed in the wagon 1 will result in the operator's hand to deflect the wire shell 16 placing it in contact with the pipe 18 and, therefore, closing the switch 10 and powering the wagon 1.

Figure 8:
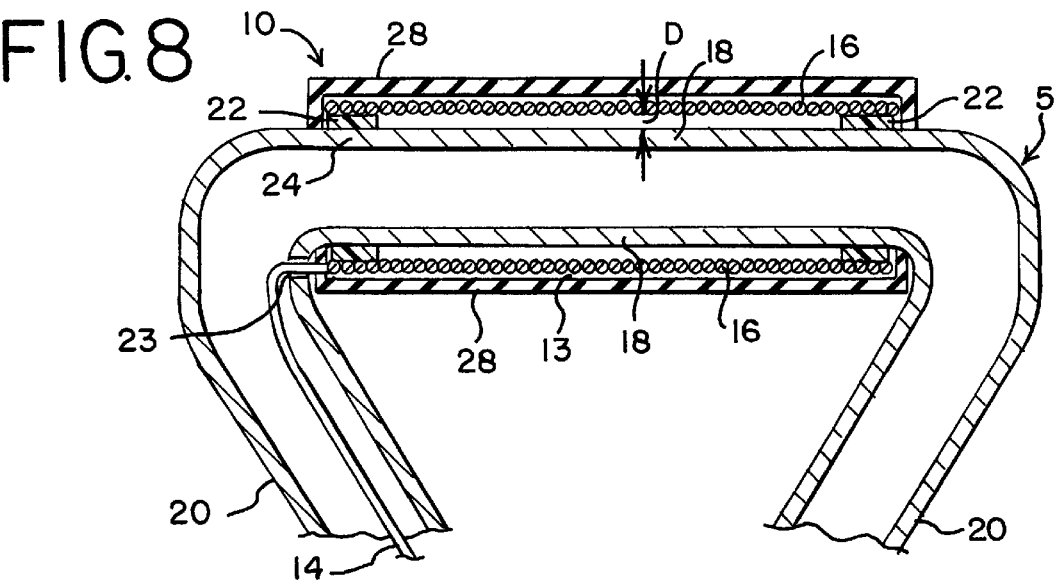
FIG. 8 is a partial cross-sectional view of another embodiment of a switch of the present invention.

As shown in FIG. 2, the switch 10 is placed over the straight section 24 of the handle 5. As discussed, the handle 5 and bar 4 could be made from different materials including metal and plastic. FIG. 8 discloses another embodiment of the switch 10 wherein the handle 5 and bar 4 are made from an integral piece of metal. In this configuration, the straight section 24 of the handle itself comprises the pipe member 18. No separate pipe member 18 is utilized. Thus, the switch 10 is constructed as explained above but with the straight section 24 comprising the pipe member 18. In particular, the spacer rings 22 are placed directly over the pipe member 18 (straight section 24), most preferably at the ends thereof. The wire shell 16 is formed and wrapped around the pipe member 18 such that the distance D is maintained between the wire shell 16 and the pipe member 18. The first lead 14 is extended from the wire shell 16. The second lead 20 can be connected to the pipe member 18. Because the pipe member 18 comprises the straight section 24 of the handle 5 with an integral metal bar 4, the second lead 20 can comprise the handle 5 and bar 4. A lead can then be attached to an opposite end of the bar 4 and then attached to the battery 6. Because the handle 5 and bar 4 themselves comprise a portion of the second lead 20, the first lead 14 must be suitably insulated from the handle 5 and bar 4 to avoid a short circuit or unwanted activation of the wagon 1. As shown in FIG. 8, the first lead 14 passes through an insulated opening 23 in the handle 5. In this embodiment, the switch 10 is activated as described above wherein the wire shell 16 is deflected to contact the pipe member 18; in this case, the straight section 24 of the handle 5. The cover 28 could also be utilized in this embodiment.

Figure 9:
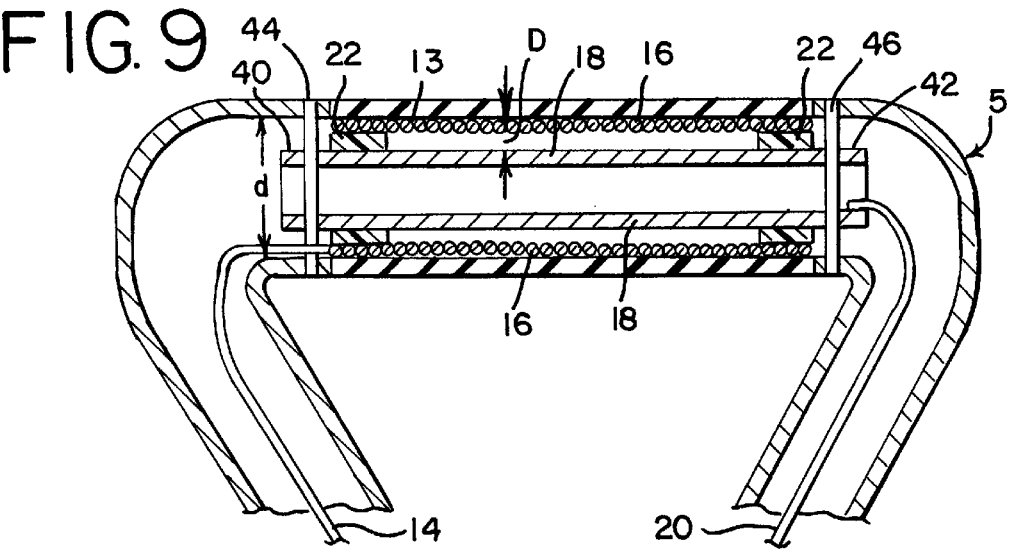
FIG. 9 is a partial cross-sectional view of another embodiment of a switch of the present invention.

FIG. 9 discloses another preferred embodiment of the switch 10. As discussed, the handle 5 and bar 4 could be constructed from plastic. In this configuration, the straight section 24 is removed from the handle 5. The handle 5 has a diameter "d." The switch 10 then is constructed as described above. In a most preferred embodiment, the pipe member 18 and wire shell 16 are sized such that when the cover 28 is utilized, the cover 28 will be flush with the handle 5. In particular, the pipe member 18 is provided having a smaller diameter than the handle 5 diameter d. The spacer rings 22 are mounted on the ends of the pipe member 18 and the second lead 20 is attached. The wire shell 16 and first lead 14 are constructed as described above and the shell 16 is slid over the pipe member 18. The switch 10 is then placed in the handle 5 where the straight section 24 was removed. The pipe member 18 has end portions 40,42 that are used to mount the switch 10 onto the handle 5. To this end, rivets 44,46 are inserted through the handle 5 and pipe member 18 to secure the switch 10 onto the handle 5. The rivets 44,46 doe not interfere with any of the leads 14,20. The cover 28 is then mounted over the wire shell 16. As discussed, in a most preferred embodiment, the switch 10 is dimensioned such that the cover 28 sits flush with the outer bounds of the handle 5. The first and second leads 14,20 are connected to the battery 6 as discussed above. The switch 10 can then be squeezed or pulled to deflect the wire shell 16 into contact with the pipe member 18 to close the circuit and power the wagon 1 as discussed with respect to FIGS. 6 and 7. Because the handle 5 and bar 4 are made of plastic, it is not important that either of the leads 14,20 be insulated from the handle 5 or bar 4. The first and second leads 14,20, however, must be insulated from one another, however, to avoid a short circuit or unwanted activation of the wagon 1.

The switch 10 can be configured to varying sensitivities. For example, the insulator rings 22 can be provided at a greater thickness t to increase the space D between the shell 16 and the pipe 18. This will require a greater squeezing or pulling force on the handle 5 to close the space D and close the switch 10. Thus, a greater distance D requires more pulling or squeezing force to deflect the wire shell 16 into contact with the pipe 18. Similarly, the diameter of the wire 11 used to construct the wire shell 16 can also be varied to affect the sensitivity of the switch 10.

Figure 10:
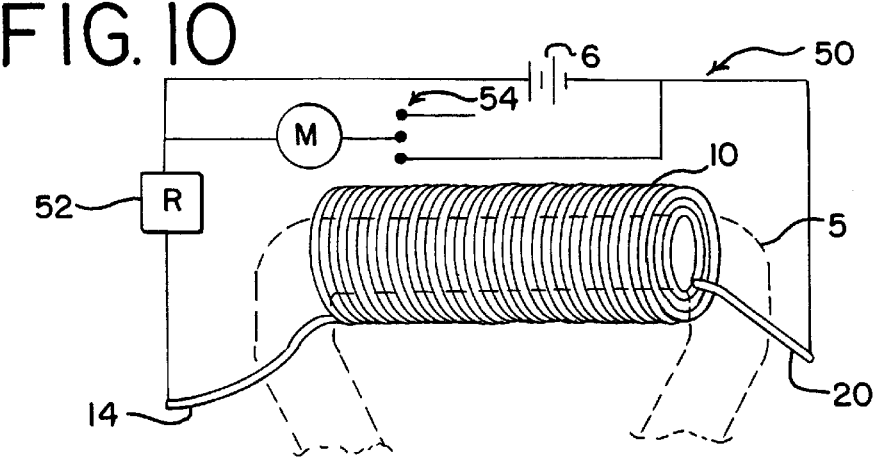
FIG. 10 is a schematic diagram of another switch circuitry of the present invention.

As shown in FIG. 7, the motors of the gear assemblies 7 are energized directly from closing the circuit via the switch 10. As shown in FIG. 10, the circuit 30 could be modified to a second circuit 50 that utilizes a relay 52. The relay 52 has associated relay contacts 54. In an unactivated state, the relay contacts 54 are open. When the switch 10 is activated as described above, the relay 50 is energized wherein the relay contacts 54 are closed. This completes the second circuit 50 and the motors of the gear assemblies 7 are powered to drive the wagon 1. The relay 52 can be used in an embodiment where the circuit is required to handle a greater amperage and voltage. Using the relay 52 in such cases lessens the chance of arcing or sparking occurring with the switch 10. Furthermore, in such case, the relay 52 will fail rather than the switch 10. The relay 52 can then be easily replaced rather than having to replace the entire switch 10 which would be more burdensome. Use of the relay 52 also prolongs the life of the switch 10.

As shown in the drawings, in one preferred embodiment, the wire shell 16 is resiliently deflectable into contact with the pipe member 18. Upon contact, the switch 10 is placed in the activated position energizing the circuit 30. It is understood, however, that the second conductor member 18 can be adapted to be the deflecting member so that it contacts the first conductor member 16. It is further understood that the activated and inactivated positions can be reversed wherein the inactivated position can be defined when the conductor members are in contact and the activated position is defined when the conductor members are not in contact.

As can be appreciated, the wagon powered according to the present invention assists an operator pulling a load placed in the wagon 1 such as a parent pulling children seated in the wagon. The parent does not have to pull the entire load manually. A person could even ride in the wagon 1 by activating the switch 10 while seated in the wagon 1. Accordingly, a person with a bad back or other condition can easily pull the wagon 1 carrying a heavy load simply by squeezing the handle 5 of the wagon 1. The powered wheels 3 assist the person in pulling the wagon 1. It is also understood that the switch 10 could also be utilized in any electrical circuit application and not solely to power a wagon. It will further be understood that different materials could be used for the shell 16 and pipe member 18 in order to provide sufficient contact surfaces. For example, the shell 16 does not necessarily require it be formed from a wire wrapped into a coil. Furthermore, different switch structures could be utilized in the handle 5 to power the wagon 1. For example, a push button having sufficient electrical contacts could be employed. The wagon handle 5 could also be equipped with a micro-switch or a squeeze lever.

The switch 10 can also be utilized in other applications in addition to a wagon or cart. The switch 10 can be used in other handles especially those in cylindrical form. The switch 10 can also be retrofitted into existing handles having a switch incorporated therein to power a load. The method of making the switch can assure that the switch 10 is sized most optimally to fit into an existing handle.

Preferred embodiments of the present invention are described herein. It is to be understood, of course, that changes and modifications may be made in the embodiments without departing from the true scope and spirit of the present invention as defined by the appended claims.

I claim:

1. A switch for closing an electrical circuit, the switch comprising:
    a first conductor member having a first lead extending therefrom;
    a second conductor member having a second lead extending therefrom;
    the first conductor and second conductor member positioned circumjacent one another wherein a space is maintained between the first conductor member and the second conductor member to define an inactivated position;
    the first lead and the second lead adapted to be connected to an electrical circuit to power a load and wherein the first conductor member is deflectable to a position contacting the second conductor member to define an activated position wherein the electrical circuit is closed,
    wherein the first conductor member is a wire shell and the second conductor is a pipe member, the pipe member having an insulator member mounted thereon, wherein the wire shell is positioned around the pipe member and the insulator member maintains a space between the first conductor member and the pipe member, wherein the switch is connected to a handle of a wagon, the wagon having means connected to the switch, for electrically powering the wagon, wherein the wire shell is deflected to contact the pipe member to place the switch in the activated position to power the wagon.

2. The switch of claim, 1 wherein the insulator member is an insulator ring mounted on the pipe member.

3. The switch of claim 2 wherein the insulator ring comprises a pair of rings, one ring positioned substantially at each end of the pipe member.

4. The switch of claim 1 wherein the wire shell comprises a wire wrapped in a coil.

5. The switch of claim 4 wherein the wire shell is bonded together by adhesive.

6. The switch of claim 1 wherein the switch is connected to a handle of a wagon.

7. The switch of claim 1 wherein the connecting means comprises a first lead having one end connected to the wire shell and another end connected to a battery via a gear assembly connected to a wheel connected to the wagon and a second lead having one end connected to the pipe member and another end connected to the battery wherein when the wire shell is deflected to contact the pipe member, the battery powers the gear assembly to drive the wagon wheel.

8. The switch of claim 7 wherein the pipe member comprises the handle of the wagon.

9. A switch for electrically powering a wagon, the wagon having a frame, at least one wheel connected to the frame for movement along a surface, the wagon further having an extension member connected to the frame, the extension member having a handle, the wagon further having a drive cooperating with the wheel for driving the wheel, the switch comprising:
    a first conductor member having a first lead extending therefrom and adapted to be connected to the motor;
    a second conductor member having an insulator mounted thereon, the second conductor member having a second lead extending therefrom and adapted to be connected to the drive;
    the first conductor member positioned circumjacent the second conductor member and insulator member wherein the insulator member maintains a space between the wire shell and the pipe member to define an inactivated position; and
    either one of the first conductor member or the second conductor member being resiliently deflectable to a second position contacting the other conductor member to define an activated position wherein an electrical connection is adapted to be made powering the wheel of the wagon,
    wherein the switch is mounted on the handle of the wagon.

10. The switch of claim 9 wherein the first conductor member is a wire shell and the second conductor member is a pipe member, the wire shell positioned over the pipe member.

11. The switch of claim 9 wherein the insulator member comprises a pair of insulator rings, one insulator ring mounted substantially at one end of the pipe member and another insulator ring mounted at another end of the member.

12. The switch of claim 4 wherein the switch is adapted to be sized to be within a diameter of the handle.

13. The switch of claim 9 further comprising a cover positioned around the wire shell.

14. The switch of claim 9 further comprising a cover positioned around the first conductor member, the cover adapted to be flush with the handle.

15. The switch of claim 9 wherein the first lead and the second lead are adapted to be routed through the handle and extension member of the wagon.

16. The switch of claim 9 wherein a relay is connected to the first lead and adapted to be connected to the drive wherein the relay is energized when the switch is placed in the activated position.

17. A wagon comprising:

a frame having at least one wheel for movement along a surface, the wheel having a motor mounted thereon, the frame further having a battery connected to the motor for driving the wheel;

a bar connected to the frame a switch connected to the bar, the switch having a wire shell having a first lead extending therefrom and routed through the bar to an underside of the frame and connected to the motor of the wheel, the switch further including a pipe member having a first insulator member mounted at one end of the pipe member and a second insulator member mounted at another end of the pipe member, the pipe member having a second lead extending therefrom and routed through the tubular bar to an underside of the frame and connected to the battery, the wire shell positioned over the pipe member and insulator member wherein the insulator member maintains a space between the wire shell and the pipe member to define an inactivated position; and wherein the wire shell is resiliently deflectable to a second position contacting the pipe member to define an activated position wherein an electrical connection is made powering the wheel of the wagon.

18. A method of manufacturing a switch for a powered wagon, the method comprising the steps of:

providing a plug;

wrapping a wire around the plug and providing a first lead at one end thereof;

applying an adhesive to the wire to bond the wire together to form a wire shell, the first lead extending from the wire shell and adapted to be connected to an electrical circuit;

removing the plug from the wire shell;

providing a pipe member;

positioning an insulator member over the pipe member;

connecting a second lead to the pipe member, the second lead adapted to be connected to the electrical circuit;

positioning the wire shell over the pipe member and sleeve wherein a space is maintained between the wire shell and the pipe member.

19. A switch for closing an electrical circuit, the switch comprising:

a first conductor member having a first lead extending therefrom, the first conductor comprising a wire shell wrapped in a coil and being bonded together by adhesive;

a second conductor member having a second lead extending therefrom;

the first conductor and second conductor member positioned circumjacent one another wherein a space is maintained between the first conductor member and the second conductor member to define an inactivated position;

the first lead and the second lead adapted to be connected to an electrical circuit to power a load and wherein the first conductor member is deflectable to a position contacting the second conductor member to define an activated position wherein the electrical circuit is closed.

20. A switch for closing an electrical circuit, the switch comprising:

a first conductor member having a first lead extending therefrom;

a second conductor member having a second lead extending therefrom;

the first conductor and second conductor member positioned circumjacent one another wherein a space is maintained between the first conductor member and the second conductor member to define an inactivated position;

the first lead and the second lead adapted to be connected to an electrical circuit to power a load and wherein the first conductor member is deflectable to a position contacting the second conductor member to define an activated position wherein the electrical circuit is closed, wherein the switch is connected to a handle of a wagon to power the wagon when the electrical circuit is closed.

\* \* \* \* \*